United States Patent [19]

Schmitz

[11] 4,089,272
[45] May 16, 1978

[54] TRANSPORTATION VEHICLE GUIDANCE APPARATUS

[75] Inventor: William E. Schmitz, Wilkinsburg, Pa.

[73] Assignee: Westinghouse Electric Corp., Pittsburgh, Pa.

[21] Appl. No.: 743,829

[22] Filed: Nov. 22, 1976

[51] Int. Cl.² .......................... B61B 13/04; B61F 9/00
[52] U.S. Cl. .................................... 104/247; 104/119; 104/246; 105/144
[58] Field of Search ............... 104/118, 120, 242, 245, 104/246, 247, 119; 105/141, 145, 144, 171, 185, 193, 201; 280/113

[56] References Cited

U.S. PATENT DOCUMENTS

| | | | |
|---|---|---|---|
| 1,870,738 | 8/1932 | Kruckenberg et al. | 104/119 |
| 3,312,180 | 4/1967 | Mueller | 104/246 |
| 3,515,405 | 6/1970 | Segar | 280/113 |
| 3,672,308 | 6/1972 | Segar | 104/246 |

Primary Examiner—Randolph A. Reese
Attorney, Agent, or Firm—R. G. Brodahl

[57] ABSTRACT

A transportation vehicle for use in a mass transit system is provided with a laterally sprung guidance apparatus operative with a vehicle restraining guide beam included with the vehicle roadway, for restraining the removal of the vehicle in relation to that roadway while providing a desired improvement in the lateral ride quality of that vehicle.

5 Claims, 6 Drawing Figures

TRANSPORTATION VEHICLE GUIDANCE APPARATUS

CROSS-REFERENCE TO RELATED PATAENT APPLICATIONS

Reference is made to U.S. patent application Ser. No. 684,057 filed on May 6, 1976 and entitled Support Apparatus For Electrically Conductive Rail by W. R. Segar and R. A. Larson, and now issued as U.S. pat. No. 4,043,436, disclosing a power rail and power collector arrangement suitable for operation with the present modified vehicle guidance apparatus, and which patent application is assigned to the same assignee as the present invention.

BACKGROUND OF THE INVENTION

It is known to provide a transportation vehicle, as disclosed in U.S. Pat. No. 3,312,180 of E. O. Mueller and U.S. Pat. No. 3,672,308 of W. R. Segar for a mass transit system, with the vehicle being automatically controlled and self-steering along a roadway having spaced track surfaces and a centrally positioned vehicle restraining I-shaped guide member. The vehicle includes a guidance apparatus consisting of a plurality of guide wheels for each drive wheel axle and engaging and locking on of the vehicle to the I-shaped central guide member. Guide wheels are coupled to each drive wheel axle housing, such that the axle with its associated drive wheels and the vehicle will be steered by the guide wheels as the vehicle moves along the roadway.

It is known in the prior art, as shown by U.S. Pat. No. 3,515,405 of W. R. Segar, to provide a transit vehicle axle suspension system including a spring support bracket having upper and lower arms rotationally fastened to the differential housing of the vehicle axle. A first spring member is vertically disposed between the vehicle body and the support bracket and a second spring member is horizontally disposed between the support bracket and the vehicle body, and if desired shock absorbers can be additionally employed to damp vertical and lateral movement of the vehicle axle suspension system. The axle suspension system permits each individual axle to rotate relative to the spring support bracket for negotiating minimum radius curves.

SUMMARY OF THE INVENTION

A laterally sprung guidance apparatus for a mass transit vehicle is provided for operation with a restraining guide beam included as part of the vehicle movement roadway, with the laterally sprung guidance apparatus providing vibration isolation from guide beam introduced lateral input forces as the vehicle moves along the roadway while retaining the desired physical lock on of the vehicle to the roadway. The guidance apparatus includes a vehicle coupling first member coupled to the drive wheel axle and a vehicle steering second member coupled to the guide wheels. The vehicle coupling first member is positioned within the vehicle steering second member, such that lateral motion between the second member and the first member is restrained and a resilient lateral force energy storage spring member is included therebetween. The spring rate of this spring member is selected in relation to the practical lateral force energy to be stored during the actual operation of the mass transit vehicle.

DESCRIPTION OF THE PREFERRED EMBODIMENT

Figure 1:
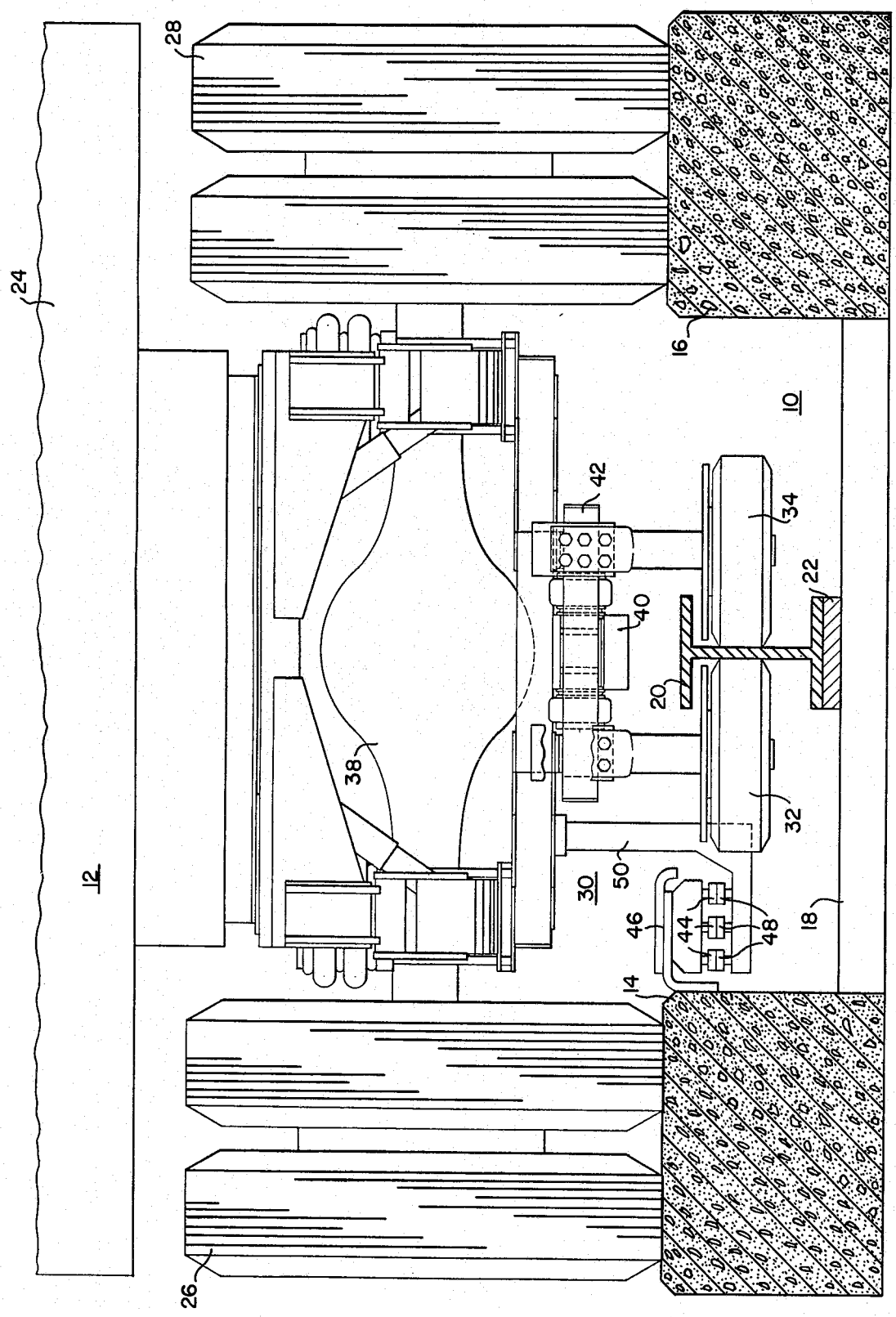
FIG. 1 shows a transverse section of the present vehicle guidance apparatus and a first roadway structure.

In FIG. 1 there is shown a roadway 10 for a mass transit vehicle 12 and including tracks 14 and 16 supported from a roadbed 18. A flanged guide beam 20 is positioned between the tracks 14 and 16 and supported by an element 22 between the roadbed 18 and the guide beam 20, which guide beam can have undesired physical irregularities in alignment position along its length. The self-propelled vehicle 12 includes a body 24 and moves along the roadway tracks 14 and 16 on support wheels 26 and 28, and is self-steering through operation of a guidance apparatus 30 including guide wheels 32 and 34. The wheels 26 and 28 are driven by an axle within an axle housing 38 fixed to a vehicle coupling member 40. A set of four opposing guide wheels including the guide wheels 32 and 34 is operative with the guide beam 20 as shown. The guide wheels each rotate about a vertical axle, with the upper ends of those vertical axles being fixed to the vehicle steering member 42. Each guide wheel includes a pneumatic tire pressed against the guide beam 20 to produce a preloading force. The guide beam 20 transmits lateral vehicle forces, such as vehicle centrifugal and steering forces to the roadbed 18. The guide beam top flange restrains and prevents the vehicle 12 from leaving the roadway 10.

The vehicle 12 is driven by an electric motor operative with the axle within the axle housing 38, with one such motor being provided for each axle housing. Electric power is supplied to the vehicle by the energized power rails 44 supported by insulated member 46 and cooperating power collectors 48 are supported by the vehicle carried arm 50. In one particular embodiment of the present invention, the guide beam has a height of 12.5 inches, the guide wheels 32 and 34 extend below the guide wheel support member 42 a distance of 12 inches, the guide wheel normal unloaded diameter is 16.3 inches, the associated metal safety discs 33 and 35 have a diameter of 14.5 inches and the running wheels 26 and 28 included pneumatic rubber tires of 8:25-20 size. An article published in the Westinghouse Engineer for January 1969 at pages 9 to 15 disclosed a similar configuration of the guide beam, the roadway tracks, the power rails and the current collectors.

Figure 2:
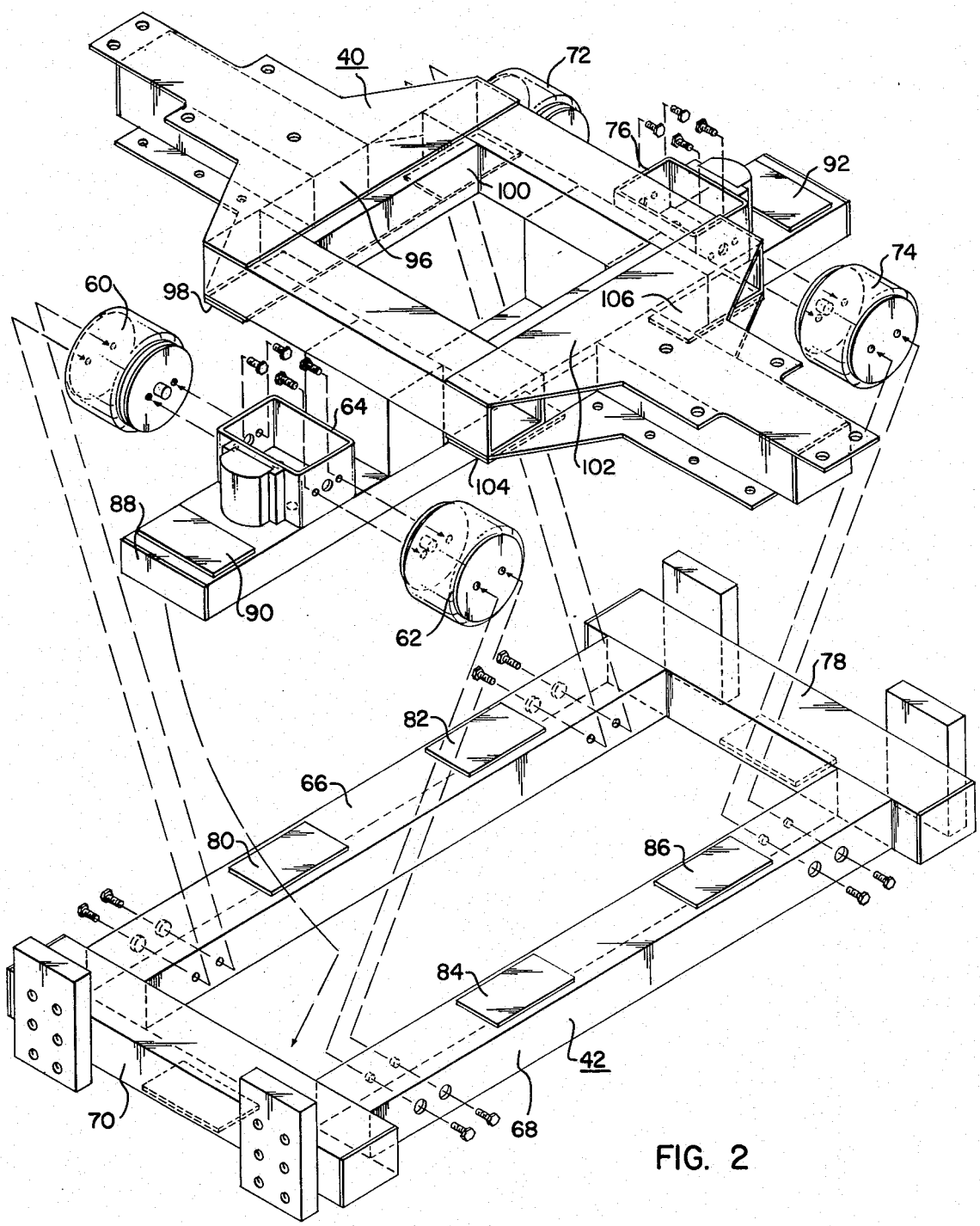
FIG. 2 shows a perspective view including the vehicle coupling member and the vehicle steering member of the present vehicle guidance apparatus.

In FIG. 2 there is shown a perspective view of the present vehicle guidance apparatus including the vehicle coupling member 40 to which the axle housing and the vehicle body are fastened and the vehicle steering member 42 to which the guide wheels are fastened.

Spring members 60 and 62 are to be positioned between the connector member 64 and the respective legs 66 and 68 at a location adjacent the end member 70 of the member 42. Spring members 72 and 74 are positioned between the connector member 76 and the respective legs 66 and 68 at a location adjacent the end member 78 of the member 42. The leg 66 includes wear pads 80 and 82 and the leg 68 includes wear pads 84 and 86. The lower portion 88 of the vehicle coupling member 40 includes a wear pad 90 and a wear pad 92. The upper portion of the vehicle coupling member 40 has a leg 96 including wear pads 98 and 100 and has a leg 102 including wear pads 104 and 106.

Figure 3:
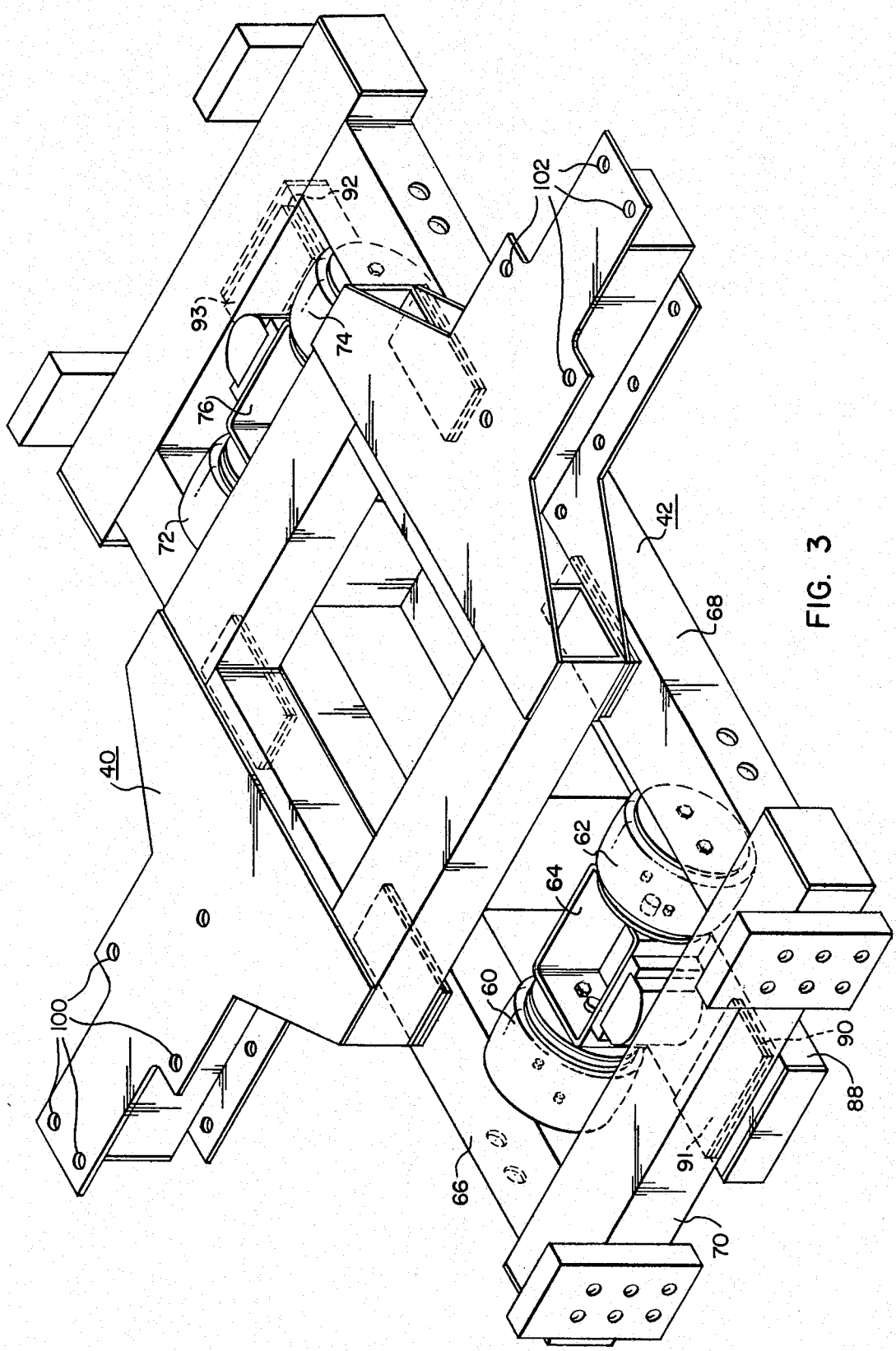
FIG. 3 shows the present guidance apparatus including the vehicle coupling member operationally coupled within the vehicle steering member and suitable for the intended operation with a mass transit vehicle.

In FIG. 3 the vehicle coupling member 40 is shown in normal operational position, with the lower portion 88 inserted below the end member 70 and between the legs 66 and 68 of the vehicle steering member 42 such that the spring members 60 and 62 are in compression between the connector member 64 and the respective legs 66 and 68. This assembly can be accomplished by removing the connector member 64 from the lower portion 88 until after the lower portion 88 is in position as shown in FIG. 3 and then fastening the connector member 64 to the lower portion 88 with the spring members 60 and 62 thereafter being provided as shown in FIG. 3. The spring members 72 and 74 are in compression between the connector member 76 and the legs 66 and 68. Two of the guide wheel vertical axles can be fastened to the leg 68 of the member 42, and two more of the guide wheel vertical axles can be fastened to the leg 68 of the member 42.

The previous guidance structure was in accordance with the disclosure of above referenced U.S. Pat. No. 3,672,308 of W. R. Segar, with the guide wheels rigidly attached to the axle housing, and the only springing effect was provided by the guide wheel pneumatic tires in relation to lateral forces introduced by physical irregularities in the alignment of the guide beam. It is desired to provide a safety lock-on requirement of the mass transit vehicle to the roadway track structure, such that under no reasonably anticipated happening would the vehicle leave the roadway track. The guidance apparatus shown in FIG. 3 satisfies this safety lock-on requirement by providing the vehicle coupling member 40 separate from the vehicle steering member 42 and cooperating together such that lateral movement of the vehicle steering member 42 per se is permitted in relation to the vehicle coupling member 40 and the vehicle body, with the lateral spring members 60, 62, 72 and 74 providing the desired lateral force isolation therebetween. The spring rate of the spring members 60, 62, 72 and 74 is selected in accordance with the measured practical magnitude of the lateral forces to be stored and that are reasonably applied between the vehicle coupling member 40 and the vehicle steering member 42. For example, when the mass transit vehicle is moving along the roadway at the intended speed of operation, such as 40 miles per hour, a spring rate of 2,000 pounds per inch is considered desirable for a mass transit vehicle weighing 40,000 pounds (gross vehicle weight).

In reference to the guidance apparatus shown in FIG. 3 the axle housing is fastened to the vehicle coupling member 40 by bolts through the holes 100 and by bolts through the holes 102. The vehicle drive wheels 26 and 28 carry the vehicle coupling member 40 along the roadway tracks 14 and 16. The vehicle steering member 42 is supported by and rides on the lower portion 88 of the vehicle coupling member 40 through operation of the provided wear pads 90 and 92 of the lower portion 88 and the corresponding wear pads 91 and 93 of the vehicle steering member 42. These members 40 and 42 are effectively locked together, with limited lateral movement being permitted through operation of the spring members 60, 62, 72 and 74, such that the guide beam irregularities cause spring member deflections rather than abrupt lateral motion of the entire car body 24. The latter spring members could comprise coil or leaf springs, air springs, hollow or solid rubber springs with the spring rate thereof selected to control the lateral deflection while providing a comfortable passenger ride on the vehicle. The lateral deflection of the vehicle should be kept within a predetermined and desired dynamic movement envelope in relation to practical widths of tunnels and station platform locations, and for example can typically be less than one inch of deflection of the vehicle steering member 42.

Figure 4:
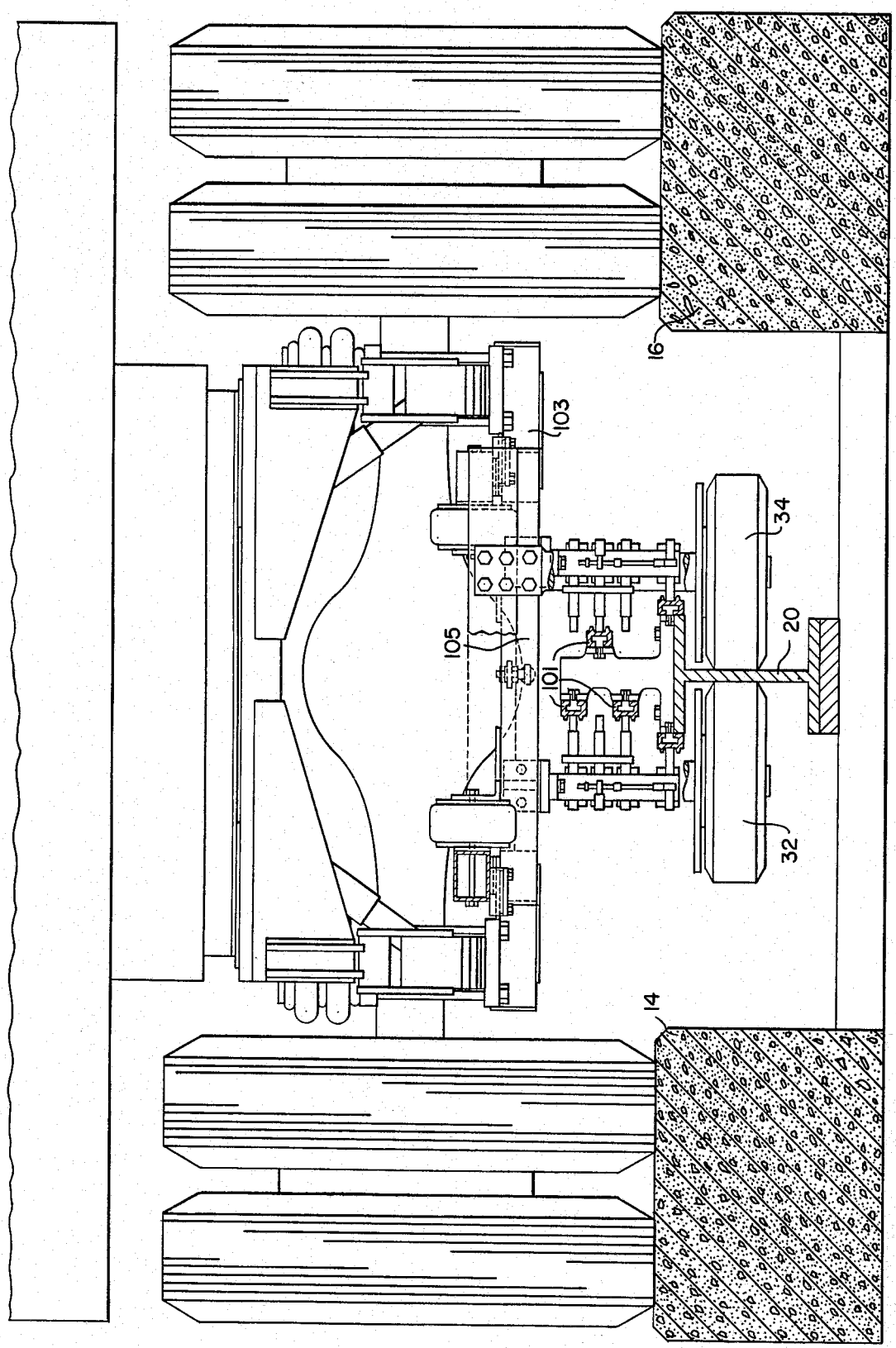
FIG. 4 shows a transverse section of a modified guidance apparatus with asecond roadway structure.

In FIG. 4 there is shown a transverse section of a modified guidance apparatus operative with the flanged guide beam 20 positioned between the roadway tracks 14 and 16 and having the power supply rails 101 positioned above the guide beam 20. A modified vehicle coupling member 103 is provided and fastened to the axle housing and the vehicle body. A modified vehicle steering member 105 is provided and fastened to the guide wheels operative with the guide beam 20.

Figure 5:
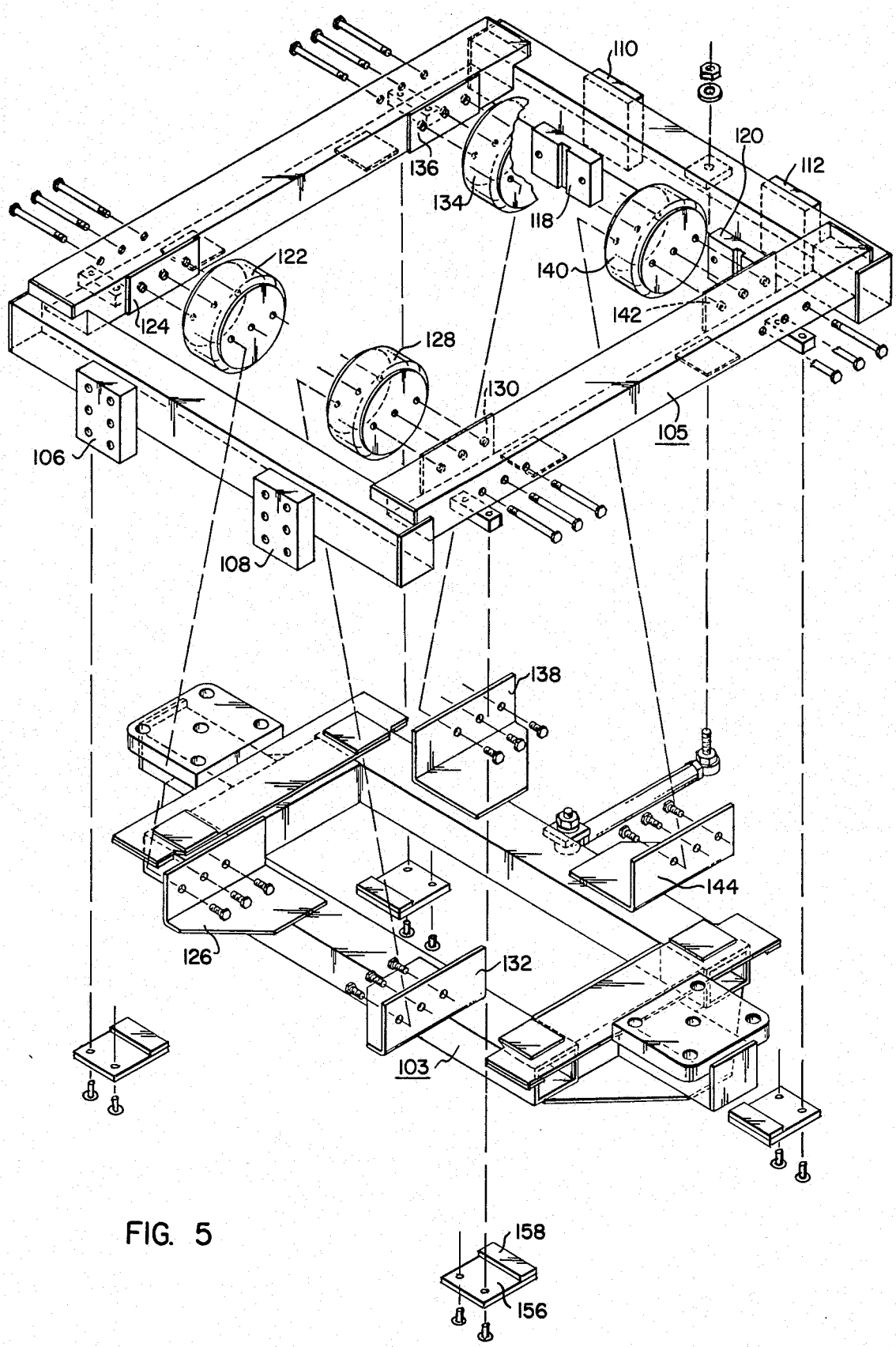
FIG. 5 shows perspective view of the modified guidance apparatus.

In FIG. 5 there is shown a perspective view of the modified guidance apparatus shown in FIG. 4, including the modified vehicle coupling member 103 to which the axle housing and the vehicle body are fastened, and the modified vehicle steering member 105 to which the guide wheels are fastened. The upper ends of the vertical axles of the guide wheels are supported by the brackets 106, 108, 110 and 112. The power collector arms are supported by the brackets 118 and 120. The spring member 122 is to be positioned between the member 124 of the vehicle steering member 105 and the member 126 of the vehicle coupling member 103. The spring member 128 is to be positioned between the member 130 and the member 132. The spring member 134 is to be positioned between the member 136 and the member 138. The spring member 140 is to be positioned between the member 142 and the member 144, when the vehicle steering member 105 and the vehicle coupling member 103 are assembled together into normal operational positions, as shown in FIG. 6.

Figure 6:
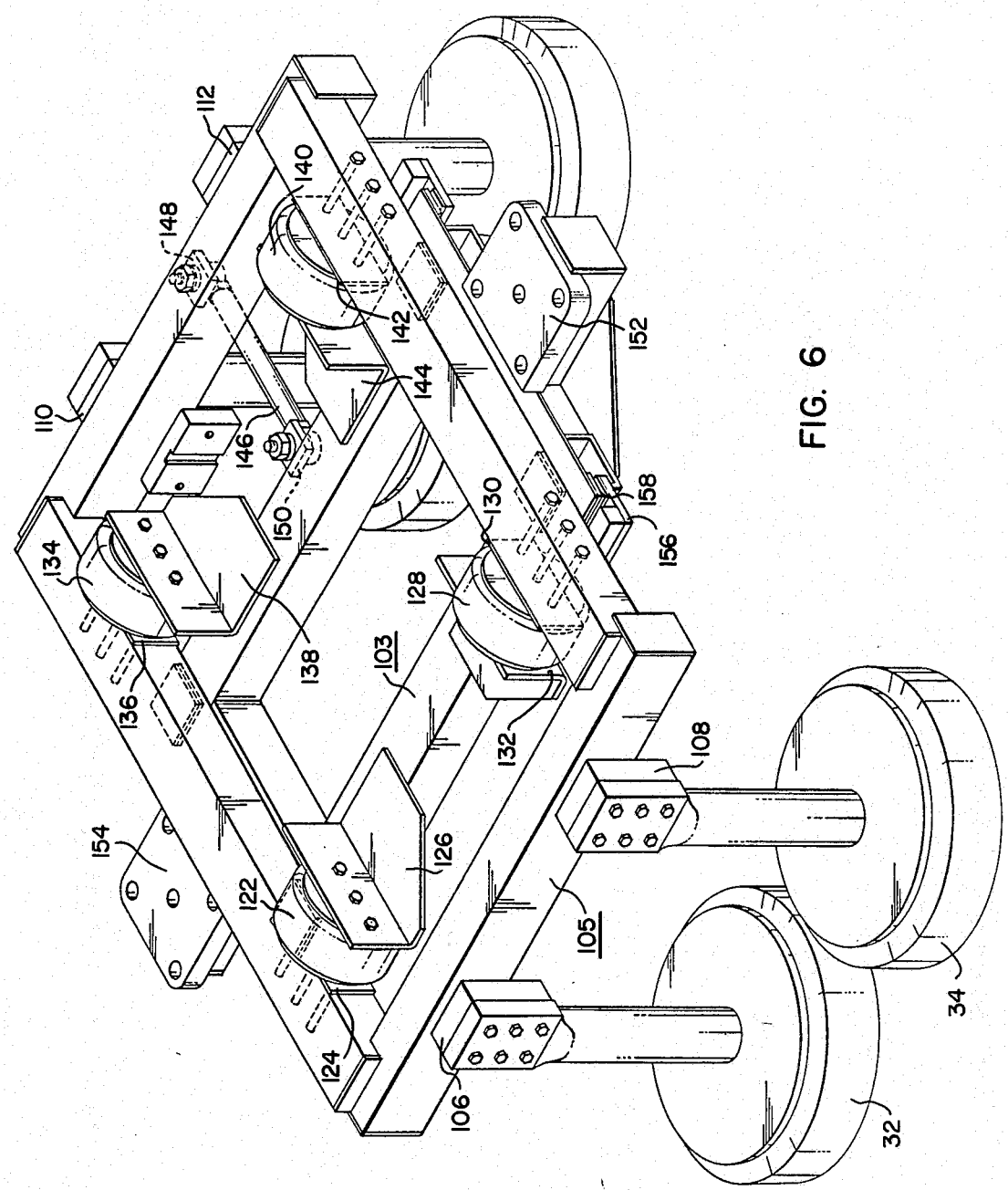
FIG. 6 shows the modified guidance apparatus including the vehicle coupling member operationally coupled with the vehicle steering member.

In FIG. 6, the vehicle coupling member 103 is shown coupled with the vehicle steering member 105 in normal operational position. The spring member 122 is now in compression between the members 124 and 126. The spring member 128 is now in compression between the members 130 and 132. The spring member 134 is now in compression between the members 136 and 138. The spring member 140 is now in compression between the members 142 and 144. A radius arm 146 is connected between a bracket member 148 fastened to the vehicle steering member 105 and a bracket member 150 fastened to the vehicle coupling member 103. The radius arm 146 prevents movement of the vehicle steering member 105 in a direction perpendicular of the axle housing extending between the fastener plate 152 and the fastener plate 154 of the vehicle coupling member 103, and does permit relative lateral movement between those members 103 and 105 in a direction parallel to the axle housing and lateral to the roadway, but as restrained by the spring members 122, 128, 134 and 140. A coupling plate, such as restraining plate 156, having a wear pad 158, is fastened to each of the four corners of the vehicle steering member 105 and couples together the member 105 and the vehicle coupling member 103 to restrain any tilting of the member 105 in relation to the member 103.

I claim:

1. In a guidance apparatus for a mass transit vehicle having support wheels operative with a roadway including spaced tracks and a vehicle restraining guide beam, said vehicle having guide wheels operative with said guide beam, the combination of:

vehicle coupling first means coupled with said support wheels and the body of said vehicle, vehicle steering second means coupled with said guide wheels for steering said vehicle along said roadway, with one of said first and second means being positioned within the other of said first and second means to provide a safety lock-on of the vehicle in relation to said guide beam, and means including a spring member positioned between said first means and said second means for coupling between said vehicle coupling first means and said vehicle steering second means to isolate the forces provided by said guide beam when the vehicle moves along said roadway.

2. The guidance apparatus of claim 1, with said vehicle coupling first means including a first portion positioned above the vehicle steering second means and a second portion positioned below the vehicle steering second means.

3. The guidance apparatus of claim 1, with said vehicle coupling first means being positioned between the vehicle steering second means and said guide beam of the roadway.

4. The guidance apparatus of claim 1, with said spring member being in compression and having a predetermined spring rate in accordance with the lateral force energy to be stored during the operation of said vehicle.

5. The guidance apparatus of claim 1, with said vehicle coupling first means being positioned within the vehicle steering second means such that lateral motion between the vehicle coupling first means and the vehicle steering second means is restrained.

* * * * *